United States Patent
Sakuma et al.

(10) Patent No.: US 6,741,775 B2
(45) Date of Patent: May 25, 2004

(54) OPTICAL SWITCH

(75) Inventors: Ken Sakuma, Sakura (JP); Daigo Fujita, Sakura (JP); Toshisada Sekiguchi, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 16 days.

(21) Appl. No.: 09/775,841

(22) Filed: Feb. 1, 2001

(65) Prior Publication Data

US 2001/0055440 A1 Dec. 27, 2001

(30) Foreign Application Priority Data

Feb. 4, 2000 (JP) ........................ 2000-028145

(51) Int. Cl.$^7$ ............................... G02B 6/26
(52) U.S. Cl. ............................ 385/45; 385/41
(58) Field of Search .................. 385/16, 46, 45, 385/41, 40, 39, 22, 14

(56) References Cited

U.S. PATENT DOCUMENTS

| | | | | |
|---|---|---|---|---|
| 5,418,868 A | * | 5/1995 | Cohen et al. | 385/16 |
| 5,757,995 A | * | 5/1998 | Chen et al. | 385/45 |
| 6,259,834 B1 | * | 7/2001 | Shani | 385/17 |
| 6,311,004 B1 | * | 10/2001 | Kenney et al. | 385/130 |

FOREIGN PATENT DOCUMENTS

| | | | |
|---|---|---|---|
| JP | 59-33430 | 2/1984 | |
| JP | 59-033430 | * 2/1984 | G02F/1/31 |
| JP | 59-73720 | 5/1984 | |
| JP | 10-20348 | 1/1988 | |
| JP | 63-256928 | 10/1988 | |
| JP | 9-21920 | 1/1997 | |
| JP | 10-20348 | 1/1998 | |
| JP | 2000-241774 | 9/2000 | |

OTHER PUBLICATIONS

Kobayashi et al., "Fluorinated Polyimide Waveguides with Low Polarization–Dependent Loss and Their Applications to Thermooptic Switches", J. Lightwave Technol., vol. 16, No. 6, pp. 1024–1029 (Jun., 1998).*
N. Ooba et al., "Low crosstalk and low loss 1×8 digital optical switch using silicone resin waveguides," Electronics Letters, vol. 35, No. 16, pp. 1364–1365 (Aug. 5$^{th}$, 1999).*
( ) English Abstract of Japan 9–21920.
J. Kobayashi et al., "Fluorinated Polyimide Waveguides with Low Polarization–Dependent Loss and Their Applications to Thermooptic Switches," J. Lightwave Technol., vol. 16, No. 6, pp. 1024–1029 (Jun., 1998).
T. Ido et al., "A 1×8 digital–optical switch using fluorinated–polyimide waveguides," in OFC 98 Technical Digest, San Jose, 1998, WH6, pp. 148–149.
L. Eldada, et al., "Thermo–optically active polymeric photonic components," in OFC 2000 Technical Digest, Baltimore, 2000 WH1 pp. 124–126.
W. Horsthuis et al., "Packaged polymeric 1×8 digital optical switches," in Proc. 21st Eur.Conf.on Opt, Comm. (ECOC '95), Brussels, 1995, Th.L.3.4, pp. 1059–1062.

* cited by examiner

*Primary Examiner*—Edward J. Glick
*Assistant Examiner*—Chih-Cheng Glen Kao
(74) *Attorney, Agent, or Firm*—Bell, Boyd & Lloyd LLC

(57) ABSTRACT

An optical switch operating on thermooptic effects has a branching section heater for heating a branching section of a core and a branched core heater for heating a branched core. The heaters are controlled separately so that the branching section and the branched core can be heated to respective temperatures so as to minimize insertion loss of inputted light and to prevent outputting light from a port not intended for light output.

9 Claims, 7 Drawing Sheets

OPTICAL SWITCH

BACKGROUND OF THE INVENTION

1. Field of the Invention

The present invention relates to an optical switch utilizing thermooptic effects. This invention is based on a Japanese Patent Application No. 2000-28145, the contents of which are incorporated herein by reference.

2. Background Art

Cross connection technology is a key technology in the next generation optical communication network. It is expected that a variety of optical switches will be utilized in the coming optical communication network.

As an example, optical switches based on thermooptic effects are known, and many operational schemes have been proposed.

FIG. 7A shows a plan view of such an optical switch, and FIG. 7B is a cross sectional view of the switch through a plane A—A in FIG. 7A.

In the diagram, reference numeral 2 relates to a substrate base upon which a cladding layer 3 is formed, and a Y-shaped core 4 is disposed in an interior of the cladding layer 3. This type optical waveguide is what is called "a buried channel optical waveguide".

Silicon substrate etc., for example, may be used for the substrate base 2. The cladding layer 3 and the Y-shaped core 4 are made of a transparent material.

The Y-shaped core 4 is made of a material having a higher refractive index than the cladding layer 3 so as to act as a optical waveguide. Also, as will be described later, the Y-shaped core 4 is preferably made of a polymeric material (plastic) so that the refractive index can be altered by application of heat.

A polymeric material similar to the Y-shaped core 4 is used preferably as the material for the cladding layer 3.

The Y-shaped core 4 is formed in such a way that a core having a cross sectional shape of a square-rod is split at a portion along length of the core into two branched cores. The Y-shaped core 4 is comprised by an input-side linear section 4a extending from the input side; a branching section 4b formed on the output side of the input-side linear section 4a, in which the width of the input-side linear section 4a increases gradually; a separation section 4c formed in a curved or linear shape so that the two branched cores 5a, 5b separate from each other as they extend from the branching section 4b; and an output-side linear section 4d in which the branched cores 5a, 5b extend parallel to each other.

In the branching section 4b, the input-side linear section 4a extends from the input end of the branching section 4b, and the branched cores 5a, 5b extend from the bottom perimeter opposite to the input end of the branching section 4b.

An input port 6a on the input side of the Y-shaped core 4 and two ports on the output side of the Y-shaped core 4 are placed coplanarly on a plane parallel to the bottom and top surfaces of the substrate base 2.

On top of the cladding layer 3, line heaters 7, 8 comprised by an electrically conductive thin film such as titanium, gold or aluminum etc. are placed so as to extend longitudinally along and on the outside of the Y-shaped core 4, part way from the input-side linear section 4a through the branching section 4b to the separation section 4c. Heater 7 is disposed on the branched core 5a side, and heater 8 is disposed on the branched core 5b side.

On both end sections of the heaters 7, 8, rectangular-shaped electrode pads 7a and electrode pads 8a are disposed, respectively, on the outer side of the Y-shaped core 4, and are connected to respective external electrodes. Electrode pads 7a and electrode pads 8a are formed as thin films and is made of a material similar to the heaters 7, 8.

Also, in the input-side linear section 4a, heaters 7, 8 are disposed away from the optical path with a suitable separation distance while in the branching section 4b and the separation section 4c, the heaters 7, 8 are disposed in close proximity to the optical path.

Therefore, if the electrical power is supplied only to heater 7, the branched core 5a side of the branching section 4b and the branched core 5a in the separation section 4c are heated. Rise in temperature causes the effective refractive index to decrease due to thermooptic effects. The result is that light is output from the branched core 5b by propagating through the branched core 5b side of the branching section 4b which is not being heated. In other words, propagation of light through the branched core 5a is selectively blocked.

On the other hand, if the electrical power is supplied only on heater 8, the branched core 5b side of the branching section 4b and the branched core 5b in the separation section 4c are heated, so that light is output from the branched core 5a by propagating through the branched core 5a side of the branching section 4b which is not being heated. In other words, propagation of light through the branched core 5b is selectively blocked.

The result is that when heater 7 is activated, a light inputted into input port 6a is output from port 6c through the branched core 5b, and when heater 8 is activated, light inputted into port 6a is output from output port 6b through the branched core 5a.

Then, by changing the action to heat the branching section 4b and the branched cores 5a by operating the heater 7 and the action to heat the branching section 4b and the branched cores 5b by operating the heaters 8, the optical path can be altered to obtain an optical switch functioning such that a light input into port 6a can be output at will from either output port 6b or 6c.

In such an optical switch, in order to guide the light from the branching section 4b to either the branched core 5a or the branched core 5b, it is necessary to adjust the temperature distribution (i.e., refractive index distribution) suitably in the branching section 4b by heating either heater 7 or heater 8.

If the heating temperature is too low, it is not possible to create a sufficient change in the refractive index in the heated section of the branching section 4b. The result is that light is transmitted through the heated section so that the light reaches the heated branched core, thereby generating an insertion loss.

Conversely, if the temperature is too high, even the refractive index in the side of the branched core intended for light output of the branching core 4b becomes affected so that the light cannot reach the branched core intended for light output, leading to an increase in the insertion loss.

On the other hand, the branched core intended for light-blocking must be heated sufficiently so as to not to permit light to be output from its port.

However, in this type of optical switch, because the branching section 4b and the separation section 4c are heated as a unit, it is experienced sometimes that if the temperature distribution in the branching section 4b is adjusted suitably, the separation section 4c cannot be heated sufficiently, and conversely, if the heating condition in the separation section 4c is adjusted suitably, appropriate temperature distribution in the branching section 4b could not be obtained.

Therefore, adjustment of heating conditions has been troublesome, and it has been difficult to reduce insertion losses.

SUMMARY OF THE INVENTION

The purpose of the present invention is to reduce insertion loss in an optical switch based on thermooptic effects.

Specifically, an object of the invention is to provide an optical switch that enables to adjust the temperature distribution in the branching section of a core and to apply optimal heat to branched cores.

To achieve the object, the present optical switch is comprised by a cladding layer and a core disposed in an interior of the cladding layer for light propagating in such a way that a width of the core is enlarged at a branching section formed at a portion along length of the core to provide plural branched cores to enable to alter a propagation path of inputted light by selective heating of portions of the branching section and the plural branched cores, wherein a branching section heater for heating the branching section and branched core heaters for heating the plural branched cores are controlled separately.

In the optical switch according to the present invention, because the heater for heating the branching section is controlled separately from the heaters for heating the plural branched cores, the branching section and the branched cores can be controlled individually at respective temperatures for their optimal performances. The result is that the insertion loss is reduced and it is possible to block outputting light from a port not intended for light output.

DESCRIPTION OF THE PREFERRED EMBODIMENTS

Figure 1:
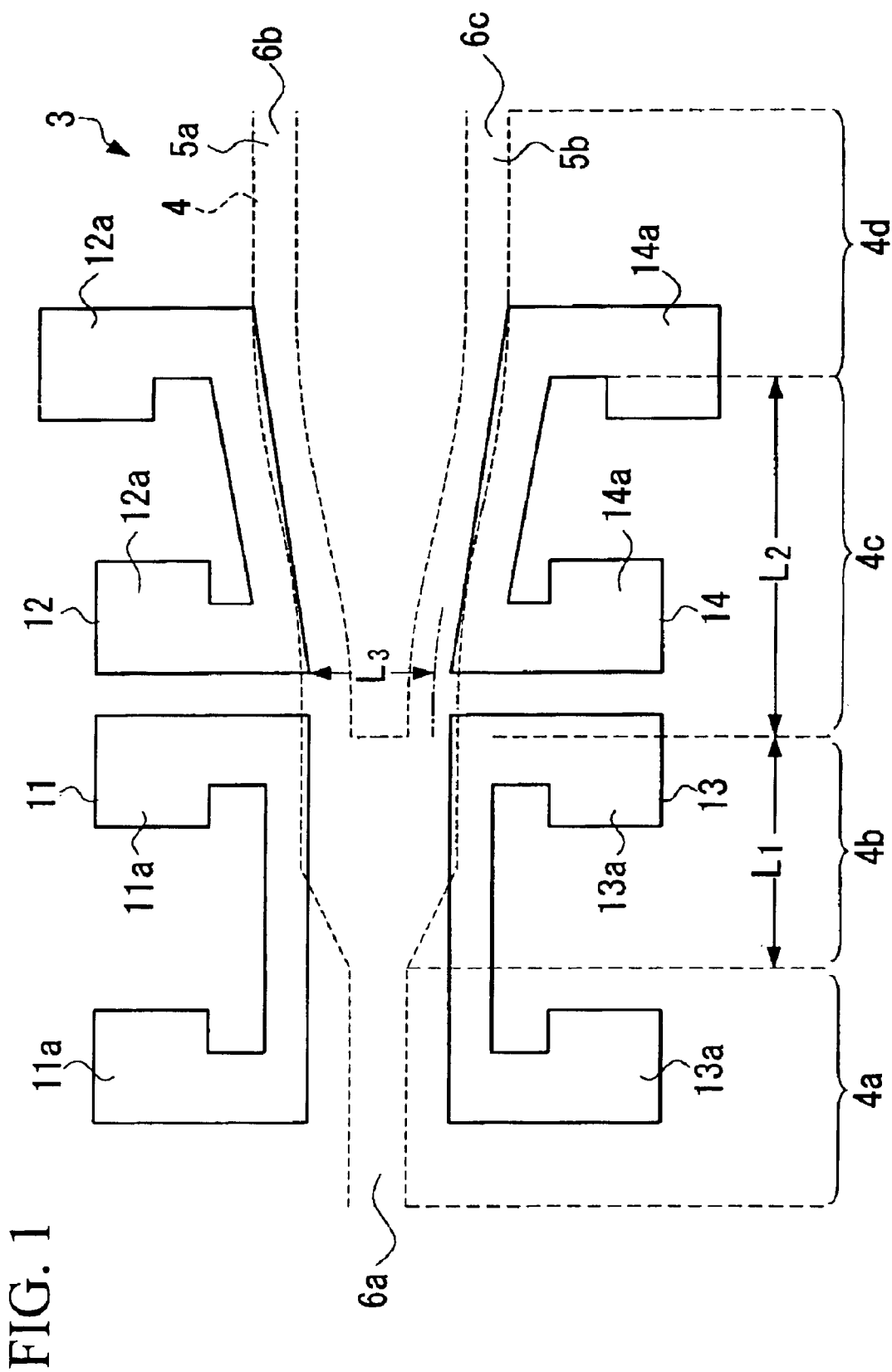
FIG. 1 is a plan view of a first example of the optical switch of the present invention.
Figure 7A:
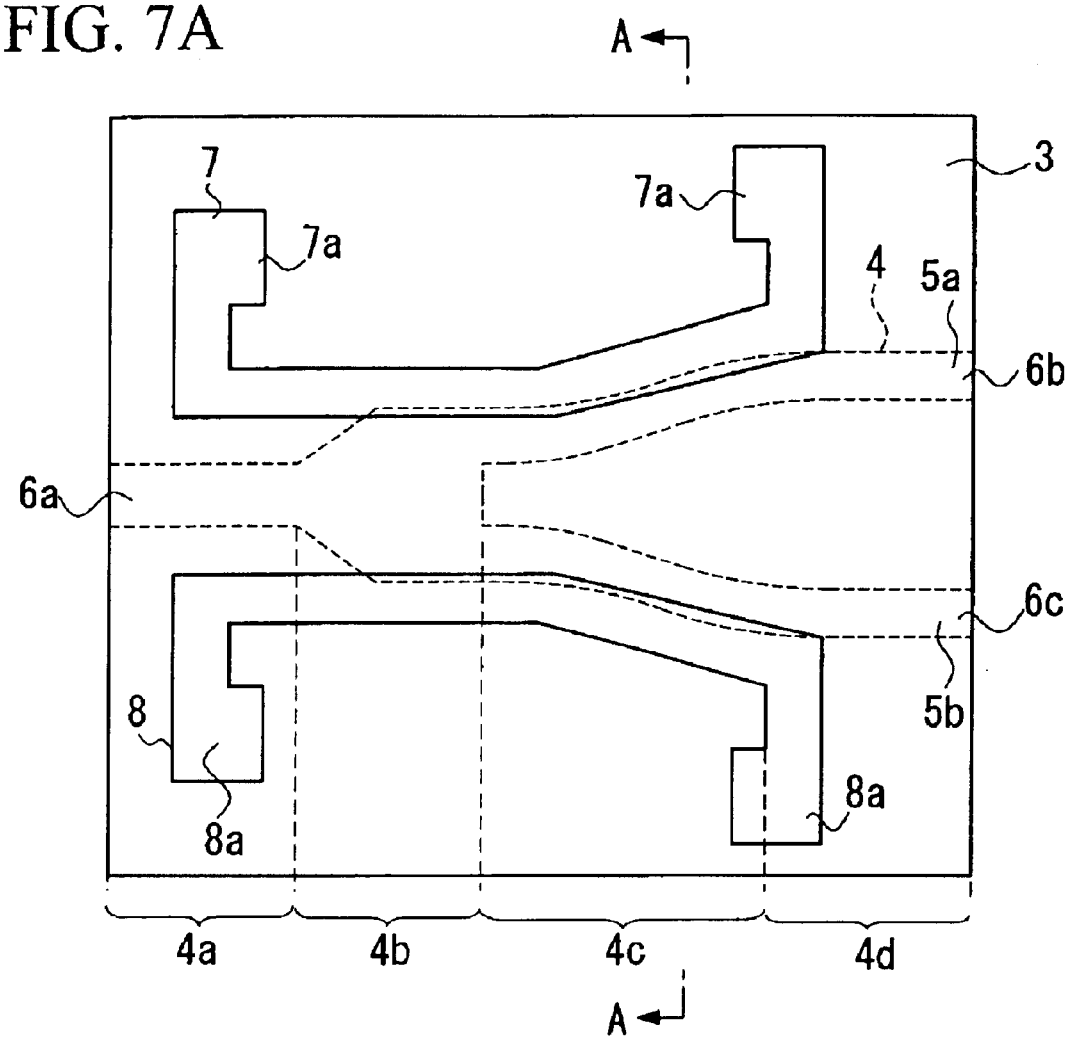
FIG. 7A is a plan view of an example of the conventional optical switch.
Figure 7B:
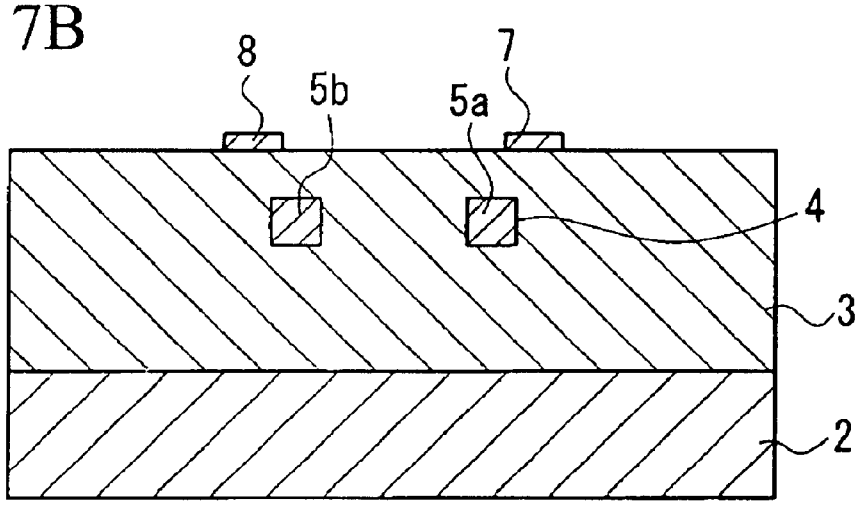
FIG. 7B is a cross sectional view through a plane A—A in FIG. 7A.

FIG. 1 is a plan view of a first example of the optical switch according to the present invention. The cladding layer 3 is formed on a substrate base 2 as in the case of the optical switch shown in FIG. 7B. The parts that are the same as those shown in FIGS. 7A, 7B are referred to by the same reference numerals.

The feature of this optical switch is the construction of the heater provided above the cladding layer 3.

That is, the heater for the branched core 5a side of the optical path is comprised by a set of heaters containing a line type branching section heater 11 disposed part way from the input-side linear section 4a towards the branching section 4b, and a line type branched core heater 12 disposed along the separation section 4c and spaced from the branching section heater 11, so that the branching section heater 11 and the branched core heater 12 can be controlled separately.

On both end sections in the branching section heater 11 and the branched core heater 12, there are provided rectangular shaped electrode pads 11a, and electrode pads 12a, which are connected to respective external electrodes.

The portion of the branching section heater 11 for heating the input-side linear section 4a is separated from the input-side linear section 4a so as not to interfere with light propagation through the input-side linear section 4a. On the other hand, the portion of the branching heater 11 for heating the branching section 4b is disposed close to the outer perimeter of the branching section 4b so as to provide quick heat to the branched core 5 a side of the branching section 4b.

Also, the branched core heater 12 is disposed close to the separation section 4c of the branched core 5a. It is preferable that the branched core heater 12 be curved to follow the shape of the separation section 4c.

The heater for the branching core 5b side of the branching section 4b is constructed similar to the heater on the branched core 5a side, and is comprised by a set of heaters containing a branching section heater 13 disposed opposite to the branching section heater 11 and having a structure similar to the branching section heater 11, and a branched core heater 14 disposed opposite to the branched core heater 12 and having a structure similar to the branched core heater 12, so that the branching section heater 13 and the branched core heater 14 can be controlled separately.

On both end sections of the branching section heater 13 and the branched core heater 14, there are provided rectangular shaped electrode pads 13a, and electrode pads 14a, which are connected to respective external electrodes.

In this example, the size of the substrate base 2 is chosen such that a perimeter parallel to the longitudinal direction of the Y-shaped core 4 measures 10 mm and a perimeter transverse to the longitudinal perimeter measures 3 mm, and the thickness is 1 mm.

The transverse cross sectional sizes of the input-side linear section 4a and the branched cores 5a, 5b at right angles to the longitudinal direction are 7×7 $\mu$m square.

The thickness of the cladding layer 3 is about 40 $\mu$m, and the Y-shaped core 4 is roughly in the middle of the cladding layer 3.

The maximum distance between the centers of the branched cores 5a, 5b is 0.25 mm, and the minimum distance is 10 $\mu$m. The longitudinal length L1 of the branching section 4b in the Y-shaped core 4 is about 0.4 mm and the length L2 of the separation section 4c is 4.4 mm.

The maximum distances between the input-side linear section 4a and the branching section heaters 11, 13 are not particularly restricted, but should be more than 10 $\mu$m on each side. The input-side linear section 4a is preferably separated from the branching heaters 11, 13 on the input port 6a side. The distances between the branching section 4b and the branching section heaters 11, 13 are not particularly restricted, but the distances from the center of the branching section 4b to the outer perimeters of the branching section heaters 11, 13 should be less than about 20 $\mu$m.

The material for making the substrate base 2 of the optical switch may be silicon etc. The cladding layer 3 and the Y-shaped core 4 are made of a transparent material. The Y-shaped core 4 has a higher refractive index than that of the cladding layer 3 for light propagating.

The Y-shaped core 4 is preferably made of a polymeric material (plastic) for producing greater thermooptic effects. Thermooptic effects are expressed by the temperature coefficient of refractive index, and the polymeric materials have greater thermooptic effects, whose temperature coefficients are an order of magnitude higher than those exhibited by glassy materials such as quartz glass etc. More specifically, for example, silicone resins, polyimide group resins such as polyimide fluoride etc., methacryl group resins such as methacrylate fluoride etc. may be used. Of these, polyimide group resins are preferable because of their high thermal resistance.

The cladding layer 3 is formed from a polymeric material similar to the material cited for making the Y-shaped core 4.

In this example, a copolymer which has a constant birefringence and is comprised by two kinds of polyimide compound is used, as disclosed in a Japanese Patent Application, First Publication, Hei 9-21920, for example.

Examples of two kinds of polyimide compound may include polyimide (6FDA/TFDB) that can be synthesized from 2,2-bis(3,4-dicarboxylphenol) hexafluoropropan dianhydride (6FDB) and 2,2'-bis(trifluoromethyl)-4,4-diaminobiphenyl (TFDB); and polyimide (6FDA/4,4'-ODA) that can be synthesized from 6FDA and 4,4'-oxydianiline (4,4'-ODA) etc. The refractive index difference between the Y-shaped core 4 and the cladding layer 3 can be altered by varying the content of two kinds of such polyimide compounds.

When the cladding layer 3 and the Y-shaped core 4 are to be made of a polymeric material, the following method may be used.

On a top surface of a substrate base 2, the lower cladding layer of a thickness to constitute the portion of the cladding layer 3 disposed below the Y-shaped core 4 is made by spin coating and the like, and a core layer to constitute the thickness of the Y-shaped core 4 is formed on the entire top surface of the lower cladding layer. The core layer is fabricated into a pattern of the Y-shaped core 4 by means of reactive ion etching and the like to produce the Y-shaped core 4, thereby exposing the lower cladding layer surrounding the Y-shaped core 4. Then, an upper cladding layer is formed on top of the lower cladding layer and the Y-shaped core 4 by spin coating and the like to complete the formation of the cladding layer 3 comprised by unitizing the lower and upper cladding layers.

Next, an electrically conductive thin film comprised by titanium, gold or aluminum etc. is formed on top of the cladding layer 3 using sputtering method and the like. The conductive film is fabricated by etching and the like to produce an electrode pattern including the rectangular shaped electrode pads and the line heater sections to complete the fabrication of branching heaters 11, 13 and branched core heaters 12, 14.

In this optical switch, thermal control can be exercised separately for the branching section heaters 11, 13 for heating the branching section 4b to alter the optical path, and for the branched core heaters 12, 14 for heating the branched cores 5a, 5b.

That is, when it is desired to transmit light from output port 6c, the branching section heater 11 and the branched core heater 12 are activated to heat the branched core 5a side of the optical path. In this case, the temperature of the branching section heater 11 is controlled so as to propagate the light to the branched core 5b side by forming a suitable temperature distribution in the branching section 4b. In the meantime, the temperature of the branched core heater 12 is raised sufficiently to selectively block the light from propagating in the branched core 5a so as to prevent transmission of light from output port 6b.

Accordingly, because it is possible to control individual heating conditions in the branching section 4b and branched core 5a separately, it is possible to provide means for reducing insertion loss and suppressing light from being transmitted from a port not intended for light output.

When it is desired to transmit light from output port 6b, the branching section heater 13 and the branched core heater 14 are activated in a similar manner, and heating conditions are controlled to provide optimal degrees of heating to the branching section 4 band the branched core 5b separately.

Additionally, if it is desired to operate the branched core heater 12, it is necessary that the branched core 5b that is intended for propagating light is protected from heat generated by the branched core heater 12. For this, although other design factors do affect the outcome, it is necessary that the minimum distance L3 between the center of the branched core 5b and the branched core heater 12 be at least 40 μm or more. Similarly, when the branched core heater 14 is activated, the branched core 5a must be protected from heat effects of the branched core heater 14, so that the minimum distance L3 between the center of the branched core 5a to the branched core heater 14 should be at least 40 μm or more. In principle, larger values of L3 are preferable so that there is no limit to the upper value.

Figure 2:
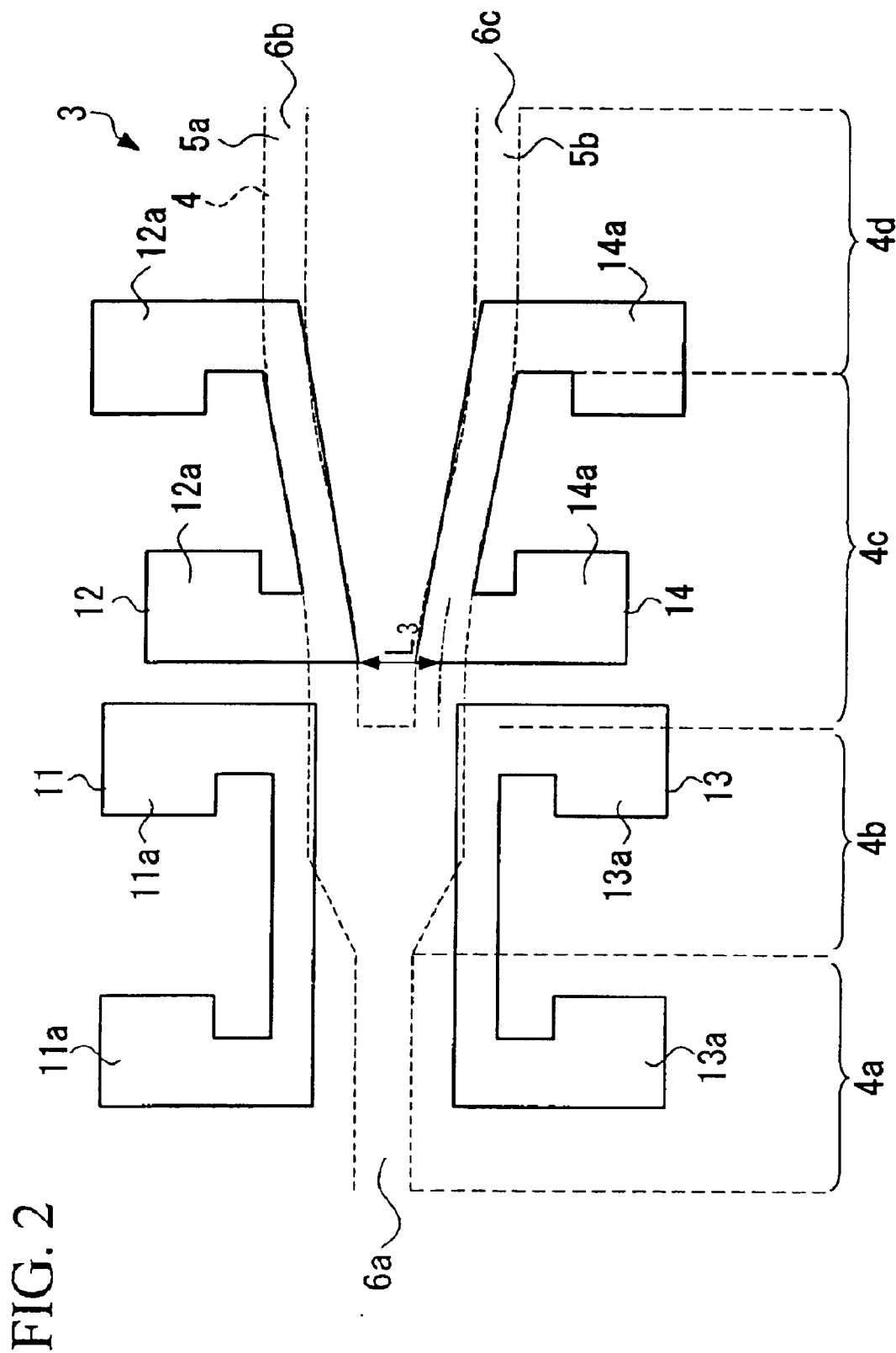
FIG. 2 is a plan view of another example of the placement of the heaters in the optical switch shown in FIG. 1.

In the first example of the optical switch, because it is desirable to have the branched cores 5a, 5b to be heated sufficiently, the branched core heaters 12, 14 may be disposed directly above the branched cores 5a, 5b in the separation section 4c, as shown in FIG. 2.

Figure 3:
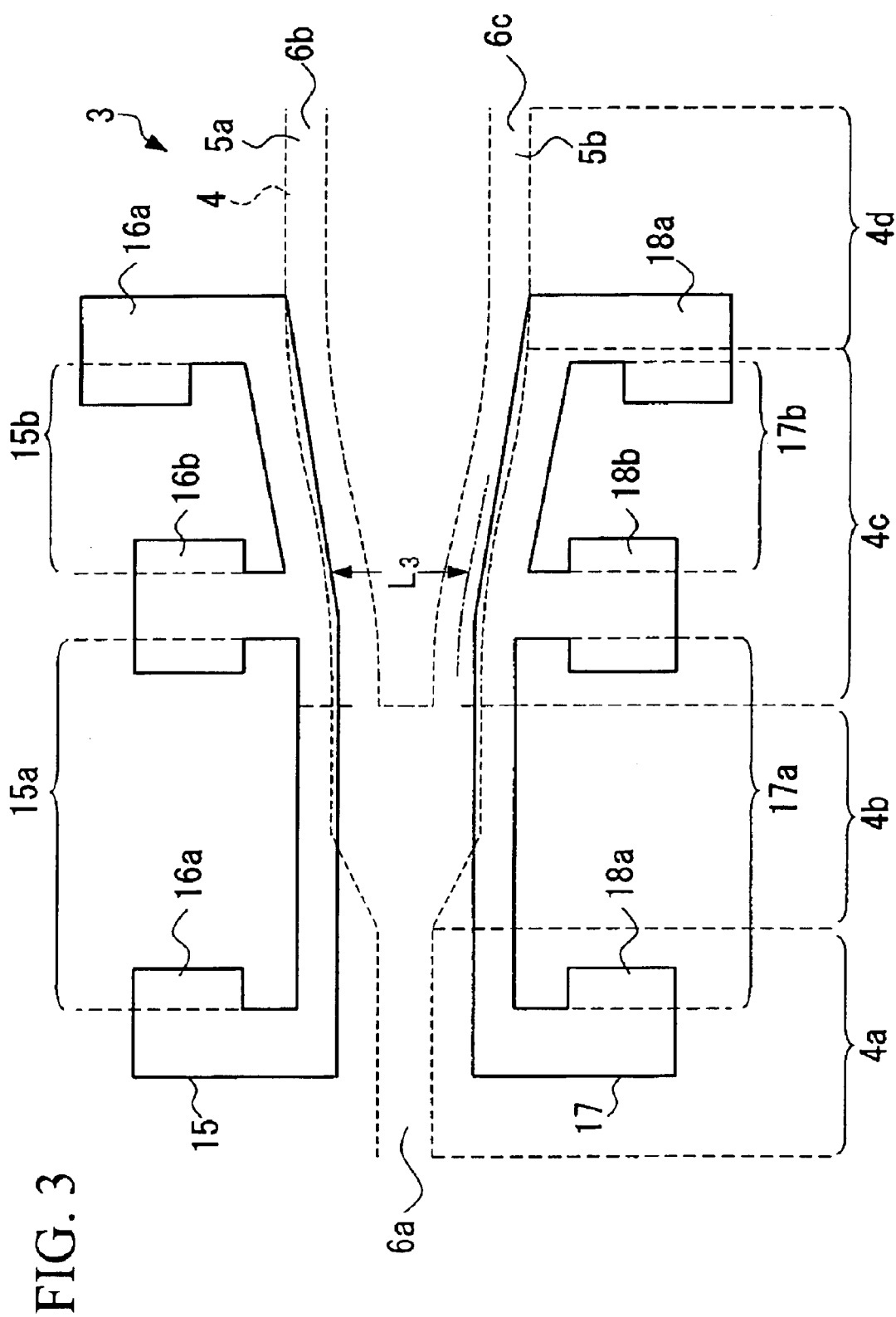
FIG. 3 is a plan view of a second example of the optical switch of the present invention.

FIG. 3 shows a second example of the present invention, which differs from the first example in the construction of the heater.

That is, the branching section heaters and the branched core heaters are formed continuously as bow-shaped unitized heaters 15, 17 along the branching section 4b and the separation section 4c so that their convex-sections are in opposition.

Electrode pads 16a of a rectangular-shape are provided on the outer side of the Y-shaped core 4 at the end sections of the unitized heater 15, and further, an electrode pad 16b is provided in the center section (part way in the separation section 4c and separated far enough from the branching section 4b that a sufficient distance L3 can be secured).

Similarly for the unitized heater 17, electrode pads 18a are provided at the end sections, and an electrode pad 18b is provided in the center section (part way in the separation section 4c and separated far enough from the branching section 4b that a sufficient distance L3 can be secured).

In the unitized heater 15, electrical power is supplied to the electrode pads 16a at both end sections and on the central electrode pad 16b. By controlling the electrical power to be supplied to the electrode pad 16a in the branching section 4b side and to the electrode pad 16a in the separation section 4c side, it is possible to provide thermal control individually for the branching section heater 15a in the branching section 4b side and for the branched core heater 15b in the separation section 4c side.

Similarly for the unitized heater 17, electrical power is supplied to the electrode pads 18a at both end sections and on the central electrode pad 18b, and it is possible to provide thermal control individually for the branching section heater 17a in the branching section 4b side and for the branched core heater 17b in the separation section 4c side.

Figure 4:
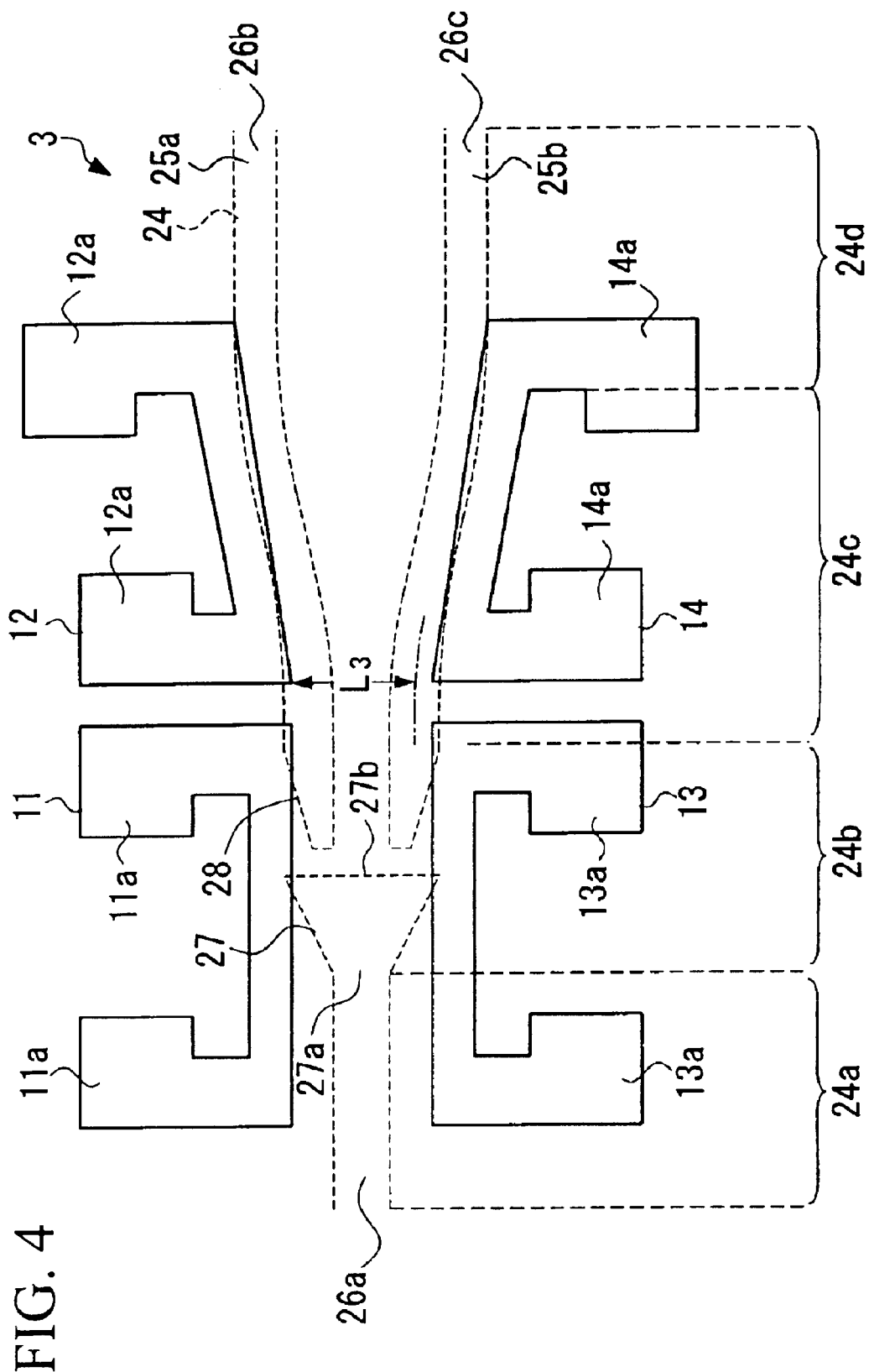
FIG. 4 is a plan view of an example of an optical switch having a core which is divided at a portion along length of the core in the branching section.

Also, it is possible to adopt a design shown in FIG. 4, in which the Y-shaped core 4 is physically separated part way. In this example, the construction of the heaters is the same as that shown in Example 1 in FIG. 1.

The Y-shaped core 24 in this example is comprised by an input-side linear section 24a extending from the light input side; a branching section 24b formed on the light output side of the input-side linear section 24a; a separation section 24c disposed in a curve-shape or a linear-shape in such a way that the two branched cores 25a, 25b extending from the light output side of the branching section 24b separate from each other; and an output-side linear section 24d so that the branched cores 25a, 25b are parallel to each other.

The branching section 24b is comprised by a light input section 27 having the input-side linear section 24a whose width gradually increases and a light output section 28 comprised by the end sections of the branched cores 25a, 25b.

The input-side linear section 24a extends from the apex 27a of the light input section 27, and the branched cores 25a, 25b extend from the base perimeter 27b that opposes the apex 27a with a small spacing of about ~5 μm. The end sections (light output section 28) of the branched cores 25a, 25b become narrower as they extend towards the base perimeter 27b.

Light inputting from an input port 26a on the input side reaches the branching section 24b through the input-side linear section 24a, and is input from the apex 27a into the light input 2 section 27 and is output from the base perimeter 27b and is input into the branched cores 25a, 25b (light output section 28) through the cladding layer 3 to propagate. The light is output through the appropriate output ports 26b, 26c. Therefore, in this case also, propagation of light takes place as illustrated in FIGS. 1–3.

Therefore, the statement in the present invention "a width of the core is enlarged at a branching section formed at a portion along length of the core to provide plural branched cores" refers to the case of the core being substantially branched at a portion along length of the core into plural cores. That is, the construction refers not only to the cases of the core formed physically continuously as illustrated in FIGS. 1–3, but also to the case of a physically separated the core that propagates light continuously, as illustrated in FIG. 4.

And, in this case also, the optical switch functions by activating either set of heaters comprised by the branching section heater 11 and the branched core heaters 12 or the branching section heater 13 and the branched core heater 14.

Also, in the examples shown in FIGS. 1–4, the Y-shaped core 4 is used and one port on the input-side and two ports on the output-side to provide a 1×2 optical switch, but the configuration of the optical switch is not limited to this type.

For example, depending on the use of the optical switch, it is possible to use an optical switch made by combining several 1×2 type switches shown in FIGS. 1–4. For example, a 1×3 optical switch may be constructed by having two 1×2 optical switches by connecting one of the output ports of one 1×2 optical switch to the input port of other 1×2 optical switch.

Also, the following example illustrates a case of combining several optical switches of the present invention sub-stantially. For example, two 1×2 Y-shaped core 4 are formed within a same cladding layer fabricated on one substrate base in such a way that the two Y-shaped cores are arranged in parallel, and one of the output ports (branched cores) of one Y-shaped core is connected to an output port (branched core) of other Y-shaped core to produce a 2×3 optical switch, comprised by two 1×2 optical switches substantially, providing two input ports and three output ports. Using the two 1×2 optical switches, a 2×2 optical switch may be produced by connecting the two sets of output ports (branched cores) together.

EMBODIMENT EXAMPLE

Figure 5:
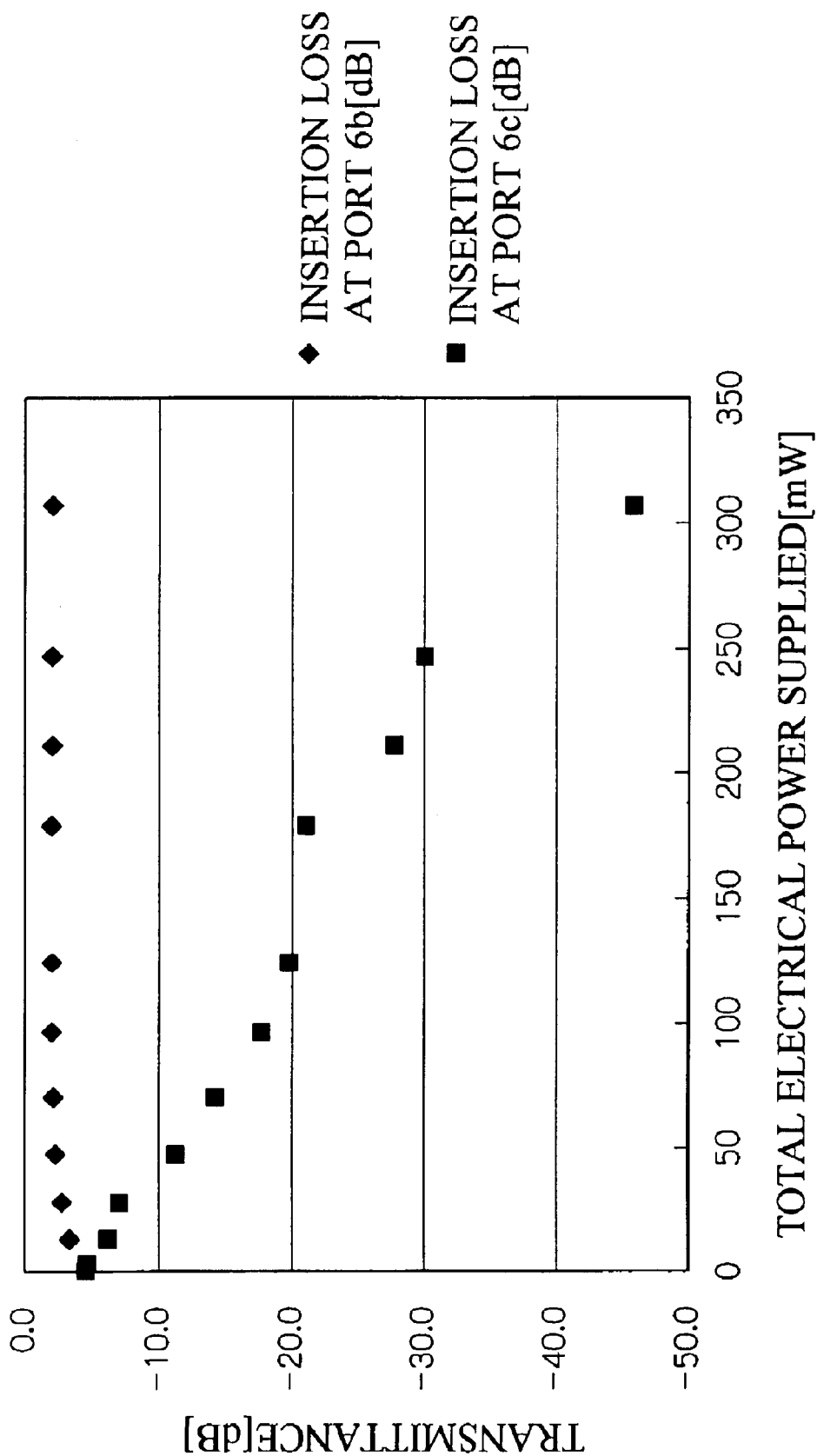
FIG. 5 is a graph showing the results of experiments conducted on an optical switch in an embodiment.

An optical switch of the configuration shown in FIG. 3 was manufactured and tested in the following manner. Varying magnitude of electrical power, as shown in Table 1, was supplied to the branching section heater 17a and the branched core heater 17b of the unitized heater 17 to heat the branched core 5b side of the optical path. Insertion losses at the output ports 6b and 6c were then determined. The results are shown in Table 1 and in a graph in FIG. 5.

Here, the losses are shown by minus signs, so that −40 dB means that the loss was 40 dB, for example.

The results showed that the magnitude of insertion loss at the output port 6b was stable and that output port 6b is not affected by the heating effects generated by the unitized heater 17 on the port 6c side.

TABLE 1

| Electrical power supplied to branching heater 17a [mW] | Electrical power supplied to branching heater 17b [mW] | Total electrical power supplied [mW] | Insertion loss at port 6b [dB] | Insertion loss at port 6c [dB] |
| --- | --- | --- | --- | --- |
| 0 | 0 | 0 | −4.4 | −4.5 |
| 3 | 0 | 3 | −4.4 | −4.5 |
| 13 | 0 | 13 | −3.2 | −6.1 |
| 28 | 0 | 28 | −2.6 | −6.9 |
| 47 | 0 | 47 | −2.1 | −11.1 |
| 71 | 0 | 71 | −2.0 | −14.0 |
| 97 | 0 | 97 | −1.9 | −17.4 |
| 125 | 0 | 125 | −1.8 | −19.6 |
| 125 | 54 | 179 | −1.8 | −20.8 |
| 125 | 87 | 212 | −1.8 | −27.5 |
| 125 | 123 | 248 | −1.8 | −29.8 |
| 125 | 183 | 308 | −1.8 | −45.7 |

COMPARISON EXAMPLE

Figure 6:
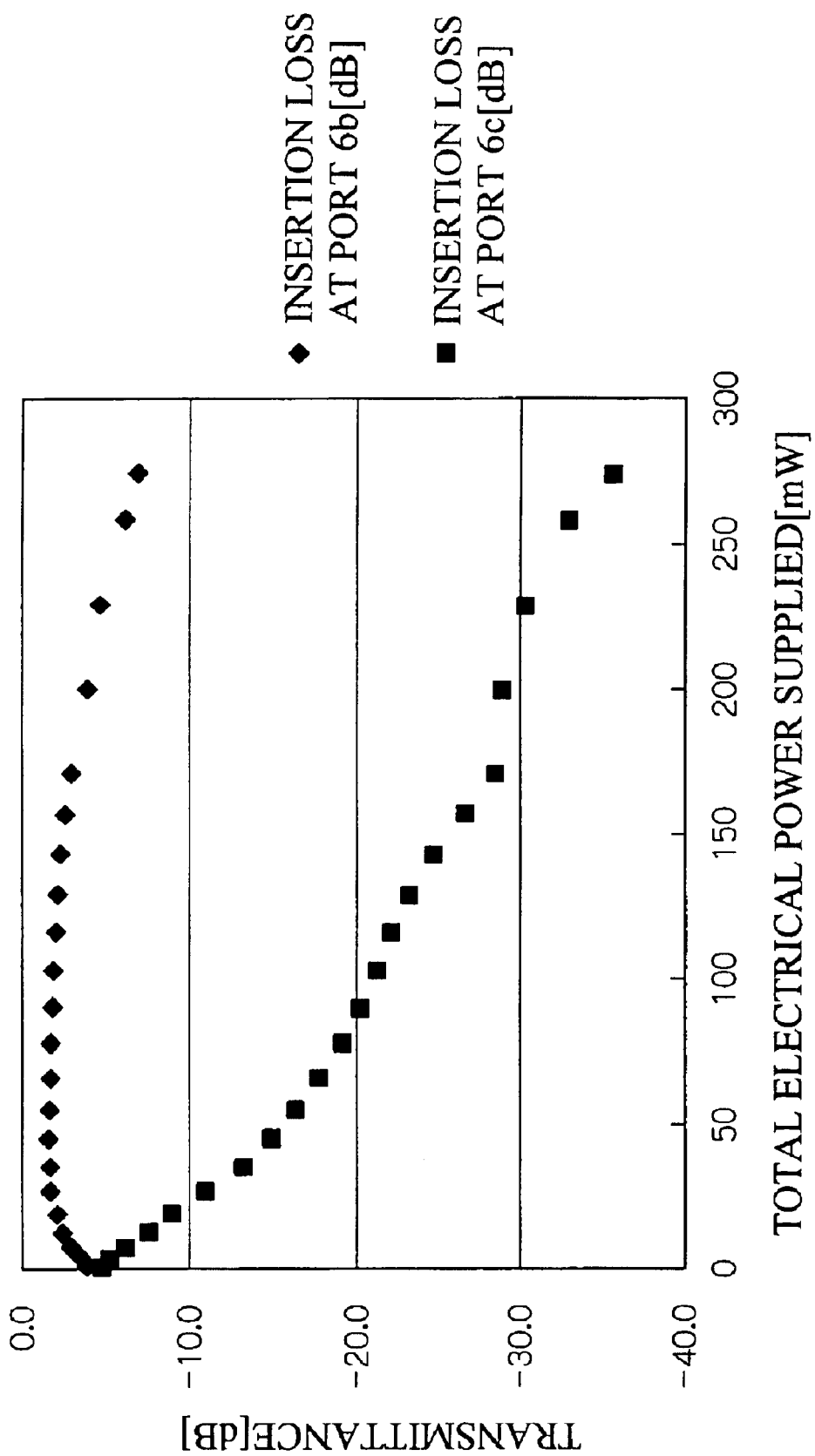
FIG. 6 is a graph showing the results of experiments conducted on a comparison optical switch (a conventional optical switch).

An optical switch of the configuration shown in FIG. 7 was manufactured and tested in the following manner. Varying magnitude of electrical power, as shown in Table 2, was supplied too the heater 8 to heat the branched core 5b side. Insertion losses at the output ports 6b and 6c were then determined. The results are shown in Table 2, and in a graph in FIG. 6.

The results showed clearly that as the electrical power is increased (i.e., as heating temperature is increased), the loss at the output port 6b increased (shifted to the minus side) by interference with propagation of light to port 6b.

TABLE 2

| Electrical power supplied [mW] | Insertion loss at port 6b, [dB] | Insertion loss at port 6c, [dB] |
|---|---|---|
| 0 | −4.0 | −4.8 |
| 1 | −3.9 | −4.9 |
| 3 | −3.5 | −5.3 |
| 7 | −3.0 | −6.2 |
| 12 | −2.5 | −7.6 |
| 19 | −2.1 | −9.0 |
| 26 | −1.8 | −11.1 |
| 35 | −1.7 | −13.2 |
| 45 | −1.7 | −15.0 |
| 55 | −1.7 | −16.5 |
| 66 | −1.7 | −17.8 |
| 78 | −1.8 | −19.2 |
| 90 | −1.8 | −20.3 |
| 103 | −1.9 | −21.2 |
| 116 | −2.0 | −22.1 |
| 129 | −2.1 | −23.1 |
| 143 | −2.3 | −24.6 |
| 157 | −2.5 | −26.5 |
| 171 | −2.8 | −28.4 |
| 200 | −3.7 | −28.7 |
| 229 | −4.5 | −30.1 |
| 258 | −5.9 | −32.8 |
| 275 | −6.7 | −35.4 |

From these results, it was confirmed that, in the embodiment of the present invention, insertion losses are reduced and it is possible to suppress output of light from a port that is not intended for light output.

What is claimed is:

1. An optical switch comprising;

a cladding layer and a core disposed in an interior of the cladding layer for light propagating in such a way that a width of the core is enlarged at a branching section formed at a portion along a length of the core to provide plural branched cores to enable an alteration of propagation path of inputted light by selective heating of portions of the branching section and the plural branched cores, and first and second branching section heaters at opposite sides of the branching section for heating different portions of the branching section and at least first and second branched core heaters for heating the plural branched cores, the first branching section heater and the first branched core heater being controlled separately and permitting individual heating conditions of the branching section and a selected branched core, the second branching section heater and the second branched core heater controlled separately and permitting individual heating conditions of the branching section and another selected branch core, each branched core heater having distances from the other selected branched core and a portion of the branching section facing the other selected branched core so as not to disturb a light-branching operation.

2. An optical switch according to claim 1, wherein a set of heaters comprised by a branching section heater and a branched core heater is provided for each core of the plural branched cores so as to selectively block propagation of light through the plural branched cores.

3. An optical switch according to claim 2, wherein said set of heaters comprised by a branching section heater and a branched core heater is constructed of separate branching section and branched core heaters.

4. An optical switch according to claim 2, wherein said set of heaters comprised by a branching section heater and a branched core heater is made as a unitized heater.

5. An optical switch according to claim 1, wherein a minimum distance separating a branching core heater of the first and second branched core heaters for heating one branched core of the plural branched cores and a center of a core adjacent to said one branched core is 40 µm or more; and a minimum distance between the branching core heater and the branching section is 40 µm or more.

6. An optical switch according to claim 1, wherein said core is a Y-shaped core having two branched cores.

7. An optical switch according to claim 1, wherein at least one of either the core or the cladding layer is comprised by a polymeric material.

8. An optical switch according to claim 1, wherein at least one of said first and second branching section heaters and at least one of said first and second branched core heaters are comprised by an electrically conductive thin film provided above the cladding layer.

9. An optical switch comprised substantially by combining in plural optical switches according to claim 1.

* * * * *